(12) United States Patent
Hauzer et al.

(10) Patent No.: US 7,964,027 B2
(45) Date of Patent: Jun. 21, 2011

(54) SYSTEM FOR EXTRACTING VAPOR AND PARTICULATES FROM A FLOW OF A LIQUID AND AN AIR STREAM

(76) Inventors: Antonius Theodorus Cecilianus Hauzer, Zaltbommel (NL); Nicolaas Van Velsen, Lopikerkapel (NL); Lili Louise Doude Van Troostwijk, Zaltbommel (NL)

( * ) Notice: Subject to any disclaimer, the term of this patent is extended or adjusted under 35 U.S.C. 154(b) by 320 days.

(21) Appl. No.: 12/036,313

(22) Filed: Feb. 25, 2008

(65) Prior Publication Data
US 2009/0211601 A1 Aug. 27, 2009

(51) Int. Cl.
*B01D 46/00* (2006.01)
(52) U.S. Cl. ............. 95/287; 55/418; 55/423; 55/467; 55/471; 55/482; 55/485; 96/417
(58) Field of Classification Search .......... 55/315.1, 55/315.2, 317, 318, 319, 320, 321, 322, 323, 55/324, 325, 326, 327, 328, 329, 330, 331, 55/332, 333, 334, 335, 336, 337, 342, 343, 55/344, 345, 346, 347, 348, 349, 350.1, 356, 55/385.1, 418, 423, 466, 467, 471, 482; 96/417, 96/420, 421; 95/287
See application file for complete search history.

(56) References Cited

U.S. PATENT DOCUMENTS

| | | | | |
|---|---|---|---|---|
| 3,721,069 A * | 3/1973 | Walker | ............... | 55/319 |
| 3,897,228 A * | 7/1975 | Berz | ............... | 96/426 |
| 4,272,261 A * | 6/1981 | Lynch et al. | ............... | 96/222 |
| 4,443,234 A * | 4/1984 | Carlsson | ............... | 96/57 |
| 5,236,595 A * | 8/1993 | Wang et al. | ............... | 210/669 |
| 5,290,331 A * | 3/1994 | Miles et al. | ............... | 55/321 |
| 5,697,293 A * | 12/1997 | Mogenier | ............... | 100/50 |
| 6,099,622 A * | 8/2000 | Dullien | ............... | 95/268 |
| 6,521,007 B1 * | 2/2003 | Tanaka et al. | ............... | 55/385.2 |
| 6,716,406 B2 * | 4/2004 | Reisfeld et al. | ............... | 423/245.1 |
| 6,758,876 B2 * | 7/2004 | Suzuki et al. | ............... | 55/385.6 |
| 6,767,378 B2 * | 7/2004 | Nishiyama et al. | ............... | 55/309 |
| 6,979,359 B2 * | 12/2005 | Laiti | ............... | 55/356 |
| 6,985,954 B1 * | 1/2006 | Philyaw et al. | ............... | 709/229 |
| 7,335,244 B2 * | 2/2008 | Kisakibaru et al. | ............... | 55/385.6 |
| 7,582,130 B2 * | 9/2009 | Ng et al. | ............... | 55/385.3 |
| 7,704,293 B2 * | 4/2010 | Wang et al. | ............... | 55/418 |
| 2001/0029845 A1 * | 10/2001 | Dyson et al. | ............... | 96/403 |
| 2003/0051449 A1 * | 3/2003 | Nishiyama et al. | ............... | 55/309 |
| 2004/0149130 A1 * | 8/2004 | Gorchev | ............... | 95/268 |
| 2005/0145109 A1 * | 7/2005 | Dancey et al. | ............... | 95/273 |
| 2005/0184005 A1 * | 8/2005 | Hauville | ............... | 210/323.1 |
| 2006/0112825 A1 * | 6/2006 | Renwart et al. | ............... | 95/273 |
| 2007/0245700 A1 * | 10/2007 | Zhu | ............... | 55/418 |
| 2007/0289449 A1 * | 12/2007 | Roberts et al. | ............... | 95/274 |
| 2008/0245235 A1 * | 10/2008 | Brioschi | ............... | 96/420 |
| 2010/0000186 A1 * | 1/2010 | Newell | ............... | 55/418 |

* cited by examiner

*Primary Examiner* — Duane Smith
*Assistant Examiner* — Thomas McKenzie
(74) *Attorney, Agent, or Firm* — Young & Thompson

(57) ABSTRACT

System for extracting vapor and particulates from a flow of at least an air stream having vapor and particulates, the system having a funnel and a filter unit; an opening of the funnel for receiving the flow of the air stream; an outlet of the funnel connected to an inlet of the filter unit, the inlet receiving the air stream. The filter unit includes a housing, a first and a second filter, a ventilation unit and a filter unit outlet; the housing having a first, second and third chamber; the first and second chambers being separated by the first filter, the second and third chambers being separated by the second filter; the inlet being located in the first chamber; the ventilation unit being located between the third chamber and the outlet and in use for creating an underpressure in the first, second and third chambers.

10 Claims, 1 Drawing Sheet

SYSTEM FOR EXTRACTING VAPOR AND PARTICULATES FROM A FLOW OF A LIQUID AND AN AIR STREAM

FIELD OF THE INVENTION

The present invention relates to a system for extracting vapor and particulates from a flow of a liquid and an air stream. Also the present invention relates to a method for extracting vapor and particulates from a flow of a liquid and an air stream. Further, the present invention relates to such a system for use during washing of a turbine engine.

BACKGROUND OF THE INVENTION

Turbine engines such as used in aircraft require as a part of their maintenance a cleaning procedure that cleans the interior of the engine, such as the turbine blades and the compressor chambers. During operation, the interior of the turbine engine collects residues from the combustion process and from materials that enter from the ambient and from the fuel. It is known that cleaning reduces the probability of defects and improves the efficiency of the turbine engine.

During cleaning, a cleaning liquid, typically water, is injected with pressurized air into the running turbine engine. The water is scattered through the turbine, and interacts with the residues within the turbine. Finally, a mixture of water and residues (in the form of particulates and dissolved chemical compounds) exits the engine at the exhaust and sides of the turbine.

WO2005/121059 describes a system and device for collecting and treating waste water from engine washing. The system has a collecting device for collecting waste liquid during a washing operation of the engine and a treatment device for treating waste liquid. According to an embodiment, the system is on a mobile cart for serving an engine during a washing operation of the engine. The mobile cart also includes adjusting means for adjusting the vertical position of the liquid separating means and/or adjusting means for adjusting the vertical position of the liquid collecting means relative the engine.

US 2006/0219269 describes a system for on-wing engine washing and water reclamation. The system has at least one spray device for introducing a cleaning liquid containing at least water into the engine while the engine is being operated, and an effluent trough for collecting the cleaning liquid from an exit end or underneath side of the engine. A source of the cleaning liquid and the effluent trough may be located on a mobile unit. Further, a treatment system for treating the collected cleaning liquid is also located on a mobile unit.

The engine washing systems from the prior art are only capable of collecting liquid and solid particulates within the liquid during the washing operation.

However, due to the injection of cleaning liquid with pressurized air, at the exhaust of the turbine also an air stream is produced which comprises vapor and finely dispersed or dissolved residues and/or particulates. Such vapor and residues will contaminate the environment and have an adverse effect on service personnel.

SUMMARY OF THE INVENTION

It is an object of the present invention to provide a system which overcomes or reduces the disadvantages of the prior art.

The object is achieved by a system for extracting vapor and particulates from a flow of at least an air stream, the air stream comprising vapor and particulates, the system comprising a funnel and a filter unit; an opening of the funnel being arranged for receiving the flow of at least the air stream; an outlet of the funnel being connected to an inlet of the filter unit, the inlet of the filter unit being arranged for receiving the air stream, wherein the filter unit further comprises a housing, a first filter and a second filter, a ventilation unit and a filter unit outlet; the housing comprising a first, second and third chamber; the first chamber and second chamber being separated by the first filter, the second chamber and third chamber being separated by the second filter; the inlet of the filter unit being located in the first chamber; the ventilation unit being located between the third chamber and the filter unit outlet and being arranged during use for creating an underpressure in the first, second and third chambers, the underpressure being relative to a pressure at the inlet of the funnel to cause the air stream to enter the inlet of the filter unit and wherein the first filter is arranged for separating the vapor from the air stream and the second filter is arranged for removal of the particulates from the air stream.

Advantageously, the system according to the present invention provides that vapor may be substantially fully removed from the air stream. Also, the system provides that any free solid particulates in the air stream may be removed from the air stream.

The present invention also relates to a method of washing a turbine engine, using a system comprising a funnel and a filter unit; an opening of the funnel being directed towards an outlet of the turbine; an outlet of the funnel being connected to an inlet of the filter unit, the filter unit comprising a housing, a first filter and a second filter, a ventilation unit and a filter unit outlet; the housing comprising a first, second and third chamber; the first chamber and second chamber being separated by the first filter, the second chamber and third chamber being separated by the second filter; the inlet of the filter unit being located in the first chamber; the ventilation unit being located between the third chamber and the filter unit outlet; the method comprising:

supplying a mixture of cleaning liquid and pressurized air in an inlet of the turbine engine; —collecting, from the outlet of the turbine engine, in the opening of the funnel a flow of at least an air stream, the air stream comprising vapor and particulates; —receiving the air stream at the inlet of the filter unit; —creating an underpressure in the first, second and third chambers, the underpressure being relative to a pressure at the inlet of the funnel to cause the air stream to enter the inlet of the filter unit; —separating the vapor from the air stream in the first filter, and removing the particulates from the air stream in the second filter.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
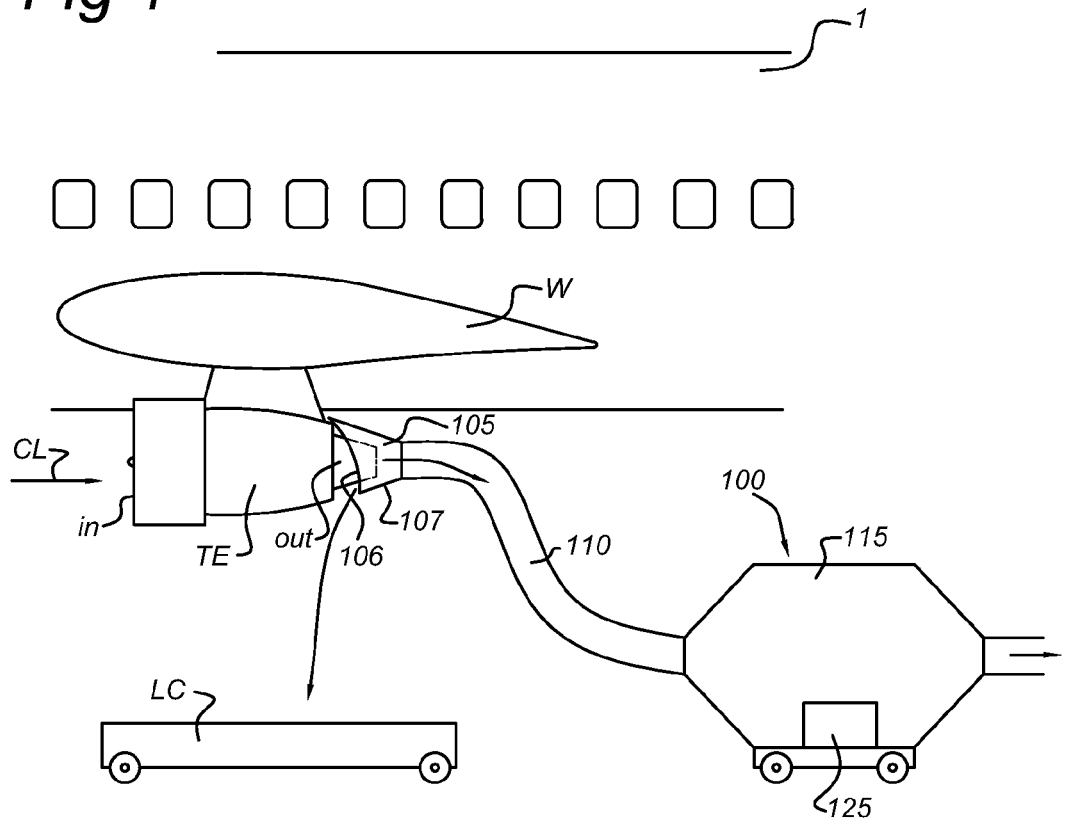
FIG. 1 depicts schematically a system according to an embodiment of the present invention as set during an on-wing engine washing operation.

FIG. 1 depicts schematically a system 100 according to an embodiment of the present invention as set during an on-wing engine washing operation.

An aircraft 1 which is located in a service area, is equipped with a number of turbine engines which may be located on-wing, i.e., suspended from the wings. In FIG. 1 one turbine engine TE is schematically depicted under a wing W.

The turbine engine has an inlet IN and an outlet OUT.

During the washing operation, a flow CL of cleaning liquid mixed with pressurized air is entered into the inlet IN of the turbine engine TE. The flow CL is schematically depicted by the arrow CL.

During the washing operation, the turbine engine TE is typically running at some speed (often driven by a start engine). The flow CL of cleaning liquid is scattered inside the turbine engine TE and interacts with possible residues within the turbine engine. As a result of the interaction, the residues are carried with the cleaning liquid towards the outlet OUT of the turbine engine TE.

At the outlet OUT, the cleaning liquid exits the turbine engine TE.

The cleaning liquid leaves the engine for one part as liquid containing residues and for another part as a vapor (or damp) mixed with residues within an air stream that originates from the pressurized air that entered the inlet IN of the turbine engine TE.

It is noted that in some cases some cleaning liquid may exit underneath the turbine engine TE, which may be collected by a receptacle device LC for collecting liquid.

Both the liquid phase part and the vapor phase part contain residues in a dissolved state and residues in the form of finely dispersed particulates.

The system 100 according to the present invention is arranged for receiving at least the air stream comprising the vapor phase part from the outlet OUT.

The system 100 according to the present invention comprises a receiving funnel 105, a flexible tube 110 and a filter unit 115.

The funnel 105 is connected to an inlet of the filter unit 115 by the flexible tube 110. The filter unit 115 will be described in more detail with reference to FIG. 2.

Figure 2:
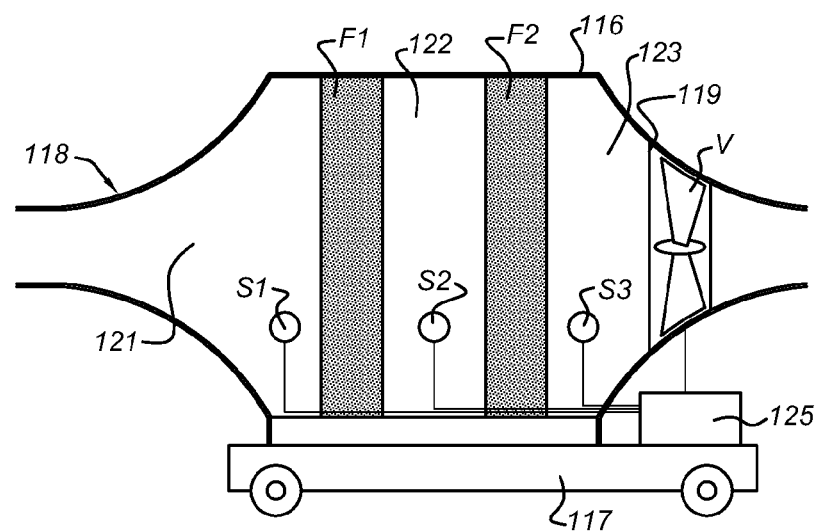
FIG. 2 depicts schematically a cross-sectional view of a filter unit of the system according to an embodiment of the present invention.

FIG. 2 depicts schematically a cross-sectional view of a filter unit of the system according to an embodiment of the present invention.

The filter unit 115 comprises a housing 116, a first filter arrangement F1, a second filter arrangement F2, a ventilation unit V, and a control system 125, S1, S2, S3.

The housing 116 is substantially airtight and comprises an inlet opening 118 and outlet opening 119.

At the inlet opening 118 the tube 110 is connected. Within the housing 116 a first chamber 121 is located which extends between the inlet opening 118 and the first filter F1. In between the first filter arrangement F1 and the second filter arrangement F2 the housing comprises a second chamber 122. Finally the housing comprises a third chamber 123 which is located between the second filter arrangement F2 and the outlet opening 119.

At the outlet opening 119 the ventilation unit V is located.

The control system 125 is arranged for control of the filter unit, and comprises a control unit 125 and first, second and third sensor units S1, S2, S3 arranged in the first, second and third chamber respectively.

The control unit 125 connects to the first sensor unit S1 in the first chamber 121, the second sensor unit S2 in the second chamber 122 and to the third sensor unit S3 in the third chamber 123. Further, the control unit 125 is connected to the ventilation unit V for controlling operational parameters of the ventilation unit.

In an embodiment, the control unit 125 comprises a computer. In a further embodiment, the control unit 125 comprises a programmable logic controller.

The first, second and third sensor units are each arranged for sensing at least one of temperature and humidity. In a further embodiment, at least one of the first, second and third sensor units is arranged also for sensing pressure in the respective corresponding chamber of the housing.

In yet a further embodiment, at least one of the first, second and third sensor units is arranged also for sensing a filtering quality, which is associated with filtering efficiency of the filters. The filtering efficiency may dependent on one or more of the following operational variables: the composition of the air stream, on the life time of each filter and a degree of contamination of each filter and on the life time of each filter.

The control unit 125 may adapt the operational parameters of the filter unit based on one or more of these operational variables.

In an embodiment, the filter unit 115 is arranged on a mobile cart 117.

Referring also to FIG. 1, during operation of the system 100, the ventilation unit is operated to create in each chamber of the housing a reduced pressure (an underpressure) relative to the ambient pressure which causes the air stream to enter and flow through the filter unit 115.

An opening 106 of the receiving funnel 105 is positioned at the outlet OUT of the turbine engine in such a way that at least the vapor phase part from the outlet OUT can enter the opening 106 of the funnel 105.

In an embodiment, the liquid phase part may also enter the funnel opening 106, but then the inflow into the filter unit is obstructed. A lower portion 107 of the funnel 105 (the part of the funnel directed towards the ground) has a surface that is inclined in such a way that inflow of the liquid phase part into the funnel is obstructed, i.e., the liquid phase part of the cleaning liquid that enters the opening of the funnel is substantially captured there, returns to the opening 106 and streams out downwards from the opening 106 of the funnel 105. The liquid phase part that streams in the downward direction is received in the receptacle device LC. It will be appreciated that if the funnel is properly aligned with the turbine engine under an appropriate inclination angle of the lower portion 107, the amount of liquid actually entering the tube 11 is negligible.

Due to the reduced pressure within the housing of the filter unit the air stream comprising the vapor phase part of the cleaning liquid is transported to the first chamber 121. The first sensor unit S1 in the first chamber senses at least one of the (relative) humidity and temperature of the air stream. Optionally, the pressure in the first chamber may be measured by the first sensor unit S1. The measured parameters as measured by the first sensor unit S1 are transmitted to the control unit 125.

Next, the reduced pressure generated by the ventilation unit V forces the air stream comprising the vapor phase part of the cleaning liquid to pass the first filter arrangement F1. The first filter arrangement F1 is arranged to separate the vapor phase part from the air stream. The first filter arrangement F1 may comprise a suitable mesh filter, but in a further embodiment the first filter arrangement F1 comprises alternatively or additionally an activated carbon filter.

After passing the first filter arrangement F1, the once filtered air stream is brought into the second chamber 122. The second sensor unit S1 in the second chamber 122 senses at least one of the (relative) humidity and temperature of the once filtered air stream, and optionally the pressure in the second chamber 122.

The once filtered air stream passes the second filter arrangement F2. The second filter arrangement F2 is arranged for filtering out individual particulates in the once filtered air stream. Next the twice filtered air stream enters the third chamber 123.

In an embodiment, the second filter arrangement F2 comprises a HEPA (high efficiency particulate air) filter, which is known to have a high efficiency for removing airborne particulates.

From the third chamber 123 the twice filtered air stream is transported by the ventilation unit to the outlet opening 119.

It has been observed that the air stream leaving the filter unit 115 at outlet opening 119 contains substantially no vapor phase part of the cleaning liquid and contains a reduced amount of individual particulates, i.e., at a lesser level than the level of particulates in the ambient of the working area.

The control unit 125 controls the operational parameters of the ventilation unit V as a function of the measured temperature and/or humidity and/or pressure parameters as obtained from one or more of the first, second and third sensor units S1, S2, S3 as described above.

In an embodiment, the control unit 125 is alternatively or additionally arranged to control the operational parameters in relation to a type of turbine engine that is being washed. Depending on the type of turbine engine, the flow of cleaning liquid and pressurized air may be different, which may affect the air stream that exits the outlet OUT of the turbine engine TE.

In an embodiment, the ventilation unit V is constructed as an explosion-proof ventilation unit which reduces risks if accidentally any combustible substance from the engine enters the filter unit 115.

It is noted that the system 100 according to the present invention is also suitable for use with turbine engines that are enclosed in or attached to a fuselage of an aircraft.

Although specific embodiments of the invention have been described, it should be understood that the embodiments are not intended to limit the invention. It will be appreciated by the person skilled in the art that other alternative and equivalent embodiments of the invention can be conceived and reduced to practice without departing from the true spirit of the invention, the scope of the invention being limited only by the appended claims.

The invention claimed is:

1. A system for extracting vapor and particulates from a flow of at least an air stream, the air stream comprising vapor and particulates, the system comprising:
    a funnel and a filter unit, an opening of the funnel being arranged for receiving the flow of at least the air stream;
    an outlet of the funnel being connected to an inlet of the filter unit, the inlet of the filter unit being arranged for receiving the air stream, wherein;
    the filter unit further comprises a housing, a first filter and a second filter, a ventilation unit and a filter unit outlet, the first filter being a vapor separation filter comprising an adsorbent filter, the second filter being a particulate air filter;
    the housing comprising a first, second and third chamber;
    the first chamber and second chamber being separated by the first filter, the second chamber and third chamber being separated by the second filter;
    the inlet of the filter unit being located in the first chamber;
    the ventilation unit being located between the third chamber and the filter unit outlet and being arranged during use for creating an underpressure in the first, second and third chambers, the underpressure being relative to a pressure at the inlet of the funnel to cause the air stream to enter the inlet of the filter unit and wherein the first filter is arranged for separating extracting the vapor from the air stream and the second filter is arranged for removal of the particulates from the air stream;
    wherein the flow of at least the air stream further comprises a flow of liquid and wherein the funnel comprises between the opening of the funnel and the inlet of the filter unit, an inclined surface in a lower portion which is arranged for obstructing the flow of the liquid towards the outlet of the funnel and for returning the obstructed liquid to the opening of the funnel for streaming out from the opening of the funnel.

2. The system according to claim 1, wherein the outlet of the funnel is connected to the inlet of the filter unit by a flexible tube.

3. The system according to claim 1, wherein the first filter comprises an activated carbon filter.

4. The system according to claim 3, wherein the first filter comprises a mesh filter.

5. The system according to claim 1, wherein the second filter comprises a high efficiency particulate air filter.

6. The system according to claim 1, wherein the filter unit comprises a control system; the control system being arranged for controlling operational parameters of the filter unit, the control system comprising a control unit, and sensor units;
    a first sensor unit being located in the first chamber, a second sensor unit being located in the second chamber and a third sensor unit being located in the third chamber; each of the sensor units being arranged for sensing at least one parameter from a group of temperature, humidity and pressure in the respective chamber;
    the control unit being connected to the sensor units for receiving the at least one sensed parameter from each sensor unit, the control unit further being connected to the ventilation unit for controlling the operational parameters of the ventilation unit based on the received at least one sensed parameter from each sensor unit.

7. The system according to claim 6, wherein the opening of the funnel is adjacent to an outlet of a turbine engine to be washed.

8. The system according to claim 7, wherein the control system is arranged to control the operational parameters based on a type of turbine engine to be washed.

9. The system according to claim 6, wherein the control system is configured for adapting the operational parameters based on a filtering quality of at least one of the first and second filters, the filtering quality being sensed by at least one of the first, second and third sensors.

10. A method of washing a turbine engine, using a system comprising a funnel and a filter unit; an opening of the funnel being directed towards an outlet of the turbine; an outlet of the funnel being connected to an inlet of the filter unit, the filter unit comprising a housing, a first filter and a second filter, a ventilation unit and a filter unit outlet, the first filter being a vapor separation filter comprising an adsorbent filter, the second filter being a particulate air filter; the housing comprising a first, second and third chamber; the first chamber and second chamber being separated by the first filter, the second chamber and third chamber being separated by the second filter; the inlet of the filter unit being located in the first chamber; the ventilation unit being located between the third chamber and the filter unit outlet; the method comprising:
    supplying a mixture of cleaning liquid and pressurized air in an inlet of the turbine engine;
    collecting, from the outlet of the turbine engine, in the opening of the funnel a flow of at least an air stream, the air stream comprising vapor and particulates; receiving the air stream at the inlet of the filter unit;

creating an underpressure in the first, second and third chambers, the underpressure being relative to a pressure at the inlet of the funnel to cause the air stream to enter the inlet of the filter unit;

extracting the vapor from the air stream in the first filter; and removing the particulates from the air stream in the second filter;

wherein the flow of at least the air stream further comprises a flow of liquid and wherein the funnel comprises between the opening of the funnel and the inlet of the filter unit, an inclined surface in a lower portion which is arranged for obstructing the flow of the liquid towards the outlet of the funnel and for returning the obstructed liquid to the opening of the funnel for streaming out from the opening of the funnel.

* * * * *